(12) United States Patent
Zhou et al.

(10) Patent No.: US 10,491,308 B2
(45) Date of Patent: Nov. 26, 2019

(54) OPTICAL SIGNAL PROCESSING METHOD AND COHERENT RECEIVER

(71) Applicant: Huawei Technologies Co., Ltd., Shenzhen (CN)

(72) Inventors: Enbo Zhou, Shenzhen (CN); Yuanjun Liang, Chengdu (CN); Tianjian Zuo, Shenzhen (CN); Liang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/906,514

(22) Filed: Feb. 27, 2018

(65) Prior Publication Data

US 2018/0191447 A1 Jul. 5, 2018

Related U.S. Application Data

(63) Continuation of application No. PCT/CN2015/088233, filed on Aug. 27, 2015.

(51) Int. Cl.
*H04B 10/61* (2013.01)
*H04J 14/06* (2006.01)
*H04B 10/50* (2013.01)

(52) U.S. Cl.
CPC ......... *H04B 10/613* (2013.01); *H04B 10/616* (2013.01); *H04B 10/5053* (2013.01);
(Continued)

(58) Field of Classification Search
CPC .. H04B 10/613; H04B 10/616; H04B 10/148; H04B 10/12; H04B 10/06; H04B 10/61; H04J 14/06; H03K 9/00; H04L 27/08
(Continued)

(56) References Cited

U.S. PATENT DOCUMENTS 5,096,312 A 3/1992 Huang
5,253,097 A * 10/1993 Naito ..................... H04B 10/61
398/204

(Continued)

FOREIGN PATENT DOCUMENTS

CN 1042242 A 5/1990
CN 101523718 A 9/2009
(Continued)

*Primary Examiner* — Abbas H Alagheband
(74) *Attorney, Agent, or Firm* — Leydig, Voit & Mayer, Ltd.

(57) ABSTRACT

An optical signal processing method and a coherent receiver, wherein an in-phase signal XI in a first polarization direction and an in-phase signal YI in a second polarization direction are added up to obtain a signal I; a quadrature signal XQ in the first polarization direction and a quadrature signal YQ in the second polarization direction are added up to obtain a signal Q; and quantization, combination, and digital signal processing are performed on the I and the Q. After summation, two signals need to be quantized. Therefore, a quantity of ADCs is reduced by half. In addition, because power consumption of a summation component is less than that of an ADS, power consumption of optical signal processing can be reduced. In addition, because there is a preset value, the summation may be performed after phase-inversion is performed on one analog signal, thereby avoiding a signal loss caused by the summation.

14 Claims, 5 Drawing Sheets

(52) U.S. Cl.
CPC .......... *H04B 10/61* (2013.01); *H04B 10/6165* (2013.01); *H04J 14/06* (2013.01)

(58) Field of Classification Search
USPC ........................................................ 398/202
See application file for complete search history.

(56) References Cited

U.S. PATENT DOCUMENTS

| | | | |
|---|---|---|---|
| 5,600,474 A | 2/1997 | Tomesen et al. | |
| 7,266,310 B1* | 9/2007 | Savory ................... | H04B 10/61 398/205 |
| 7,315,584 B1* | 1/2008 | Epworth ................ | H04B 10/61 375/316 |
| 7,555,227 B2* | 6/2009 | Bontu ................ | H04B 10/2572 398/202 |
| 8,301,039 B2* | 10/2012 | Nishihara .............. | H04B 10/61 375/229 |
| 8,805,206 B2 | 8/2014 | Roberts et al. | |
| 8,934,782 B2* | 1/2015 | Nakagawa ......... | H04B 10/5053 398/152 |
| 9,264,145 B2* | 2/2016 | Randel ............... | H04B 10/6161 |
| 9,515,743 B2* | 12/2016 | Suzuki ............... | H04B 10/6166 |
| 9,584,161 B2* | 2/2017 | Sato ..................... | H03M 13/353 |
| 2006/0285854 A1* | 12/2006 | Sun ......................... | H03L 7/085 398/155 |
| 2006/0285855 A1* | 12/2006 | Sun ......................... | H03L 7/085 398/155 |
| 2007/0092259 A1 | 4/2007 | Bontu et al. | |
| 2009/0279648 A1 | 11/2009 | Hasegawa | |
| 2011/0194855 A1* | 8/2011 | Batshon ................. | H04B 10/60 398/65 |
| 2014/0199068 A1* | 7/2014 | Kaneda .............. | H04B 10/6166 398/65 |
| 2015/0162991 A1* | 6/2015 | Gupta .................... | H04B 10/61 398/202 |
| 2017/0026095 A1* | 1/2017 | Ashrafi ................ | H04B 7/0456 |

FOREIGN PATENT DOCUMENTS

| | | |
|---|---|---|
| CN | 102087421 A | 6/2011 |
| CN | 102142901 B | 7/2013 |
| CN | 103780519 A | 5/2014 |
| CN | 104639259 A | 5/2015 |
| WO | 8607513 A1 | 12/1986 |
| WO | 2004054138 A2 | 6/2004 |
| WO | 2013132513 A1 | 9/2013 |
| WO | 2015103804 A1 | 7/2015 |

* cited by examiner

OPTICAL SIGNAL PROCESSING METHOD AND COHERENT RECEIVER

CROSS-REFERENCE TO RELATED APPLICATIONS

This application is a continuation of International Application No. PCT/CN2015/088233, filed on Aug. 27, 2015, the disclosure of which is hereby incorporated by reference in its entirety.

TECHNICAL FIELD

This application relates to the communications field, and in particular, to an optical signal processing method and a coherent receiver.

BACKGROUND

In a conventional coherent optical communications architecture, a transmit end transmits a complex electric field signal of polarization multiplexing. The signal is transmitted through an optical path. A receive end receives an optical signal by means of coherence reception, and performs digital signal processing on the received optical signal, to restore the complex signal of the transmit end.

Generally, a conventional optical signal receiver needs to use four analog-to-digital converters (ADCs), and therefore has relatively high power consumption.

SUMMARY

In a research procedure, the inventor finds that a quantity of analog signals that need to be quantized may be reduced by first adding up related signals in four analog signals and then performing quantization, so as to reduce a quantity of ADCs and reduce receive power consumption of an optical signal. However, when analog optical signals to be added up are orthogonal because state of polarization rotation occurs, a received signal is lost because of signal cancellation after the addition.

Therefore, this application provides an optical signal processing method and a coherent receiver, so as to reduce receive power consumption of an optical signal while ensuring normal reception of the optical signal.

To achieve the foregoing objective, this application provides the following technical solutions.

A first aspect of this application provides an optical signal processing method, including:

separately quantizing, by a coherent receiver, an in-phase signal I and a quadrature signal Q; and after combining quantized signals into a complex signal, performing, by the coherent receiver, digital signal processing on the complex signal, where a procedure of obtaining the in-phase signal I includes: calculating, by the coherent receiver, a sum of the XI and the YI; and if the sum of the XI and the YI is less than a preset value, obtaining the in-phase signal I by calculating a sum of a first phase-inverted analog signal and the XI or the YI whichever has a larger amplitude, where the first phase-inverted analog signal is a signal obtained by performing phase-inversion processing on the XI or the YI whichever has a smaller amplitude; and a procedure of obtaining the quadrature signal Q includes: calculating, by the coherent receiver, a sum of the XQ and the YQ; and if the sum of the XQ and the YQ is less than a preset value, obtaining the quadrature signal Q by calculating a sum of a second phase-inverted analog signal and the XQ or the YQ whichever has a larger amplitude, where the second phase-inverted analog signal is a signal obtained by performing phase-inversion processing on the XQ or the YQ whichever has a smaller amplitude.

Based on the first aspect, in a first implementation of the first aspect, the procedure of obtaining the in-phase signal I further includes:

if the sum of the XI and the YI is not less than the preset value, the sum of the XI and the YI is a summation result; and the procedure of obtaining the quadrature signal Q further includes:

if the sum of the XQ and the YQ is not less than the preset value, the sum of the XQ and the YQ is a summation result.

Based on the first aspect, in a second implementation of the first aspect, the performing digital signal processing on the complex signal includes:

performing normalization processing on the complex signal, and performing data signal processing on the normalization result.

A second aspect of this application provides an optical signal processing method, including:

separately quantizing, by a coherent receiver, an in-phase signal I, a received quadrature analog signal XQ in a first polarization direction, and a received quadrature analog signal YQ in a second polarization direction; and after combining quantized signals into a complex signal, performing, by the coherent receiver, digital signal processing on the complex signal, where a procedure of obtaining the in-phase signal I includes: calculating, by the coherent receiver, a sum of the XI and the YI; and if the sum of the XI and the YI is less than a preset value, obtaining the in-phase signal I by calculating a sum of a first phase-inverted analog signal and the XI or the YI whichever has a larger amplitude, where the first phase-inverted analog signal is a signal obtained by performing phase-inversion processing on the XI or the YI whichever has a smaller amplitude.

Based on the second aspect, in a first implementation of the second aspect, the procedure of obtaining the in-phase signal I further includes:

if the sum of the XI and the YI is not less than the preset value, the sum of the XI and the YI is a summation result.

A third aspect of this application provides an optical signal processing method, including:

separately quantizing, by a coherent receiver, a quadrature signal Q, a received in-phase analog signal XI in a first polarization direction, and a received in-phase analog signal YI in a second polarization direction; and after combining quantized signals into a complex signal, performing, by the coherent receiver, digital signal processing on the complex signal, where a procedure of obtaining the quadrature signal Q includes: calculating, by the coherent receiver, a sum of the XQ and the YQ; and if the sum of the XQ and the YQ is less than a preset value, obtaining the quadrature signal Q by calculating a sum of a second phase-inverted analog signal and the XQ or the YQ whichever has a larger amplitude, where the second phase-inverted analog signal is a signal obtained by performing phase-inversion processing on the XQ or the YQ whichever has a smaller amplitude.

Based on the third aspect, in a first implementation of the third aspect, the procedure of obtaining the quadrature signal Q further includes:

if the sum of the XQ and the YQ is not less than the preset value, the sum of the XQ and the YQ is a summation result.

A fourth aspect of this application provides a coherent receiver, including:

a quantization module, configured to separately quantize an in-phase signal I and a quadrature signal Q;

a digital signal processing module, configured to: after quantized signals are combined into a complex signal, perform digital signal processing on the complex signal; and a summation module, configured to obtain the in-phase signal I and obtain the quadrature signal Q, where a procedure of obtaining the in-phase signal I includes: calculating a sum of an in-phase analog signal XI in a first polarization direction and a received in-phase analog signal YI in a second polarization direction; and if the sum of the XI and the YI is less than a preset value, obtaining the in-phase signal I by calculating a sum of a first phase-inverted analog signal and the XI or the YI whichever has a larger amplitude, where the first phase-inverted analog signal is a signal obtained by performing phase-inversion processing on the XI or the YI whichever has a smaller amplitude; and a procedure of obtaining the quadrature signal Q includes: calculating a sum of a received quadrature analog signal XQ in the first polarization direction and a received quadrature analog signal YQ in the second polarization direction; and if the sum of the XQ and the YQ is less than a preset value, obtaining the quadrature signal Q by calculating a sum of a second phase-inverted analog signal and the XQ or the YQ whichever has a larger amplitude, where the second phase-inverted analog signal is a signal obtained by performing phase-inversion processing on the XQ or the YQ whichever has a smaller amplitude.

Based on the fourth aspect, in a first implementation of the fourth aspect, the summation module includes:

a summation circuit, a phase-inversion control circuit, and an output control circuit, where the summation circuit is configured to calculate a sum of a first analog signal and a second analog signal;

the phase-inversion control circuit is configured to: if an amplitude of the sum of the first analog signal and the second analog signal is less than a preset value, perform phase-inversion processing on the first analog signal or the second analog signal whichever has a smaller amplitude, to obtain a phase-inverted analog signal;

the summation circuit is further configured to calculate a sum of the phase-inverted analog signal and the first analog signal or the second analog signal whichever has a larger amplitude; and the output control circuit is configured to: if the amplitude of the sum of the first analog signal and the second analog signal is not less than the preset value, output the sum of the phase-inverted analog signal and the first analog signal or the second analog signal whichever has a larger amplitude, where if the summation module is configured to calculate the in-phase signal I, the first analog signal is the XI, the second analog signal is the YI, and the phase-inverted analog signal is the first phase-inverted analog signal; or if the summation module is configured to calculate the quadrature signal Q, the first analog signal is the XQ, the second analog signal is the YQ, and the phase-inverted analog signal is the second phase-inverted analog signal.

In a second implementation of the fourth aspect, the output control circuit is further configured to:

if the amplitude of the sum of the first analog signal and the second analog signal is less than the preset value, output the sum of the first analog signal and the second analog signal.

In a third implementation of the fourth aspect, the phase-inversion control circuit includes:

a first comparator, configured to output a high level if the amplitude of the sum of the first analog signal and the second analog signal is less than the preset value;

a second comparator, configured to: output a high level if an amplitude of the first analog signal is less than an amplitude of the second analog signal, or output a low level if an amplitude of the second analog signal is less than an amplitude of the first analog signal;

a first phase-inverter, separately connected to the first comparator and the second comparator by using a first logical AND gate, where when both the first comparator and the second comparator output a high level, a phase-inversion function is triggered by a high level that is output by the first logical AND gate, to obtain the phase-inverted analog signal; and a second phase-inverter, connected to the first comparator by using a second logical AND gate and connected to the second comparator by using the second logical AND gate and a logical NOT gate, where when the first comparator outputs the high level and the second comparator outputs the low level, a phase-inversion function is triggered by a high level that is output by the second logical AND gate, to obtain the phase-inverted analog signal.

In a fourth implementation of the fourth aspect, the first comparator is further configured to:

output a low level if the amplitude of the sum of the first analog signal and the second analog signal is not less than the preset value.

In a fifth implementation of the fourth aspect, the coherent receiver further includes:

a first positive envelope detector, configured to detect a positive envelope value of the first analog signal;

a first analog integrator, configured to calculate the amplitude of the first analog signal according to the positive envelope value of the first analog signal;

a second positive envelope detector, configured to detect a positive envelope value of the second analog signal;

a second analog integrator, configured to calculate the amplitude of the second analog signal according to the positive envelope value of the second analog signal;

a third positive envelope detector, configured to detect a positive envelope value of an output signal of the summation circuit; and a third analog integrator, configured to calculate an amplitude of the output signal of the summation circuit according to the positive envelope value of the output signal of the summation circuit.

In a sixth implementation of the fourth aspect, the phase-inversion control circuit includes:

a processor, configured to: output a high level if the amplitude of the sum of the first analog signal and the second analog signal is less than the preset value, or output a low level if the amplitude of the sum of the first analog signal and the second analog signal is not less than the preset value;

a comparator, configured to: output a high level if an amplitude of the first analog signal is less than an amplitude of the second analog signal, or output a low level if an amplitude of the second analog signal is less than an amplitude of the first analog signal;

a first phase-inverter, separately connected to the processor and the comparator by using a first logical AND gate, where when both the processor and the comparator output a high level, a phase-inversion function is triggered by a high level that is output by the first logical AND gate, to obtain the phase-inverted analog signal; and a second phase-inverter, connected to the processor by using a second logical AND gate and connected to the comparator by using the second logical AND gate and a logical NOT gate, where when the processor outputs the high level and the comparator outputs the low level, a phase-inversion function is triggered by a high level that is output by the second logical AND gate, to obtain the phase-inverted analog signal.

In a seventh implementation of the fourth aspect, the coherent receiver further includes:

a first digital sampler, configured to perform sampling on the first analog signal;

a first DSP integrator, configured to calculate the amplitude of the first analog signal according to a sampling value of the first analog signal;

a second digital sampler, configured to perform sampling on the second analog signal;

a second DSP integrator, configured to calculate the amplitude of the second analog signal according to a sampling value of the second analog signal; and a third digital sampler, configured to perform sampling on an output signal of the summation circuit, where the processor is further configured to:

calculate an amplitude of the output signal of the summation circuit according to a sampling value of the output signal of the summation circuit.

In an eighth implementation of the fourth aspect, the summation circuit includes:

a phase-inverter and a subtractor, where the phase-inverter is connected to an input end of the subtractor, and is configured to perform phase-inversion processing on the first analog signal; and the subtractor is configured to output a result that is obtained by subtracting a first phase-inverted analog signal from the second analog signal.

In a ninth implementation of the fourth aspect, that the processing module is configured to: after quantized signals are combined into a complex signal, perform digital signal processing on the complex signal includes:

the processing module is specifically configured to: perform normalization processing on the complex signal, and perform data signal processing on the normalization result.

According to the optical signal processing method and the coherent receiver that are provided in this application, the in-phase analog signal XI in the first polarization direction and the in-phase analog signal YI in the second polarization direction may be first added up to obtain the in-phase signal I; the quadrature analog signal XQ in the first polarization direction and the quadrature analog signal YQ in the second polarization direction are added up to obtain the quadrature signal Q; and then quantization, combination, and digital signal processing are performed. After summation, a quantity of signals that need to be quantized changes from 4 (the XI, the YI, the XQ, and the YQ) to 2 (the I and the Q) or 3 (the I, the XQ, and the YQ; or the Q, the XI, and the YI). Therefore, compared with the prior art in which four signals need to be separately quantized, a quantity of ADCs is reduced. In addition, because power consumption of a summation component is far less than that of an ADS, power consumption of optical signal processing can be reduced. In addition, because there is a preset value, the summation may be performed after phase-inversion is performed on one analog signal, thereby avoiding a signal loss caused by the summation. It can be learned that, according to the method and the coherent receiver in this application, receive power consumption of an optical signal can be reduced while normal reception of the optical signal is ensured.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The embodiments of this application disclose an optical signal processing method and a receiver, to demodulate a modulated optical signal based on a summation result of an optical signal that is received by means of coherence.

In the embodiments of this application, the optical signal to be demodulated may be a single-polarization modulated optical signal, or may be a double-polarization modulated optical signal.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Figure 1:
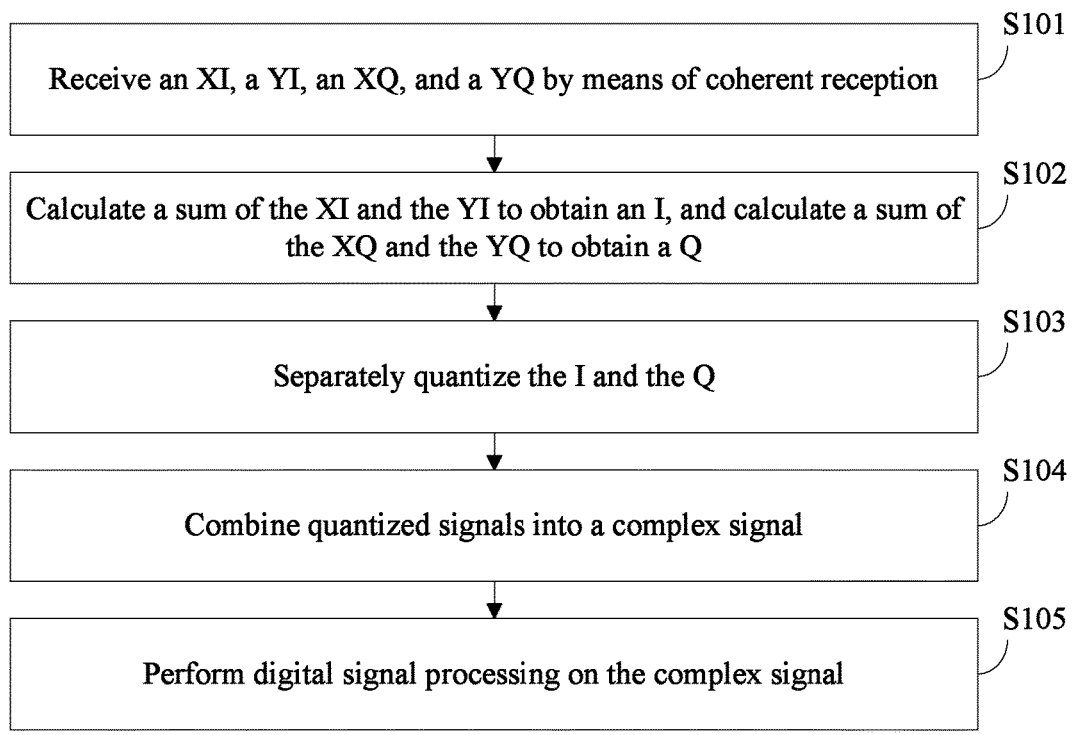
FIG. 1 is a flowchart of an optical signal processing method according to an embodiment of the present invention.

An embodiment of this application further discloses an optical signal processing method. As shown in FIG. 1, the optical signal processing method includes the following steps (all the steps are performed by a coherent receiver).

S101. Receive, by means of coherent reception, an in-phase signal XI ($I_{PD,1}$) in a first polarization direction (an x direction), an in-phase analog signal YI ($I_{PD,2}$) in a second polarization direction (a y direction), a quadrature analog signal XQ ($I_{PD,3}$) in the first polarization direction, and a quadrature analog signal YQ ($I_{PD,4}$) in the second polarization direction.

S102. Calculate a sum of the XI and the YI to obtain an in-phase signal I, and calculate a sum of the XQ and the YQ to obtain a quadrature signal Q.

S103. Separately quantize the I and the Q.

Generally, an ADC may be used to quantize an analog signal. In this embodiment, only two ADCs need to be used for the two signals I and Q.

S104. Combine quantized signals into a complex signal.

Using an I and a Q in a formula (4) as an example, a complex signal combined in an optical digital signal processing (optical Digital signal processing, oDSP) digital domain is as follows:

$$I_f = I_I + jI_Q \sim \sqrt{P_s(t)P_{LO}} \left( \sqrt{\alpha} \exp\{j(\omega_{IF}t + \theta_{sig}(t) - \theta_{LO}(t) + \delta)\} + \sqrt{1-\alpha} \exp\{j(\omega_{IF}t + \theta_{sig}(t) - \theta_{LO}(t))\} \right) \quad (5)$$

$$= \sqrt{P_s(t)P_{LO}} \exp\{j(\omega_{IF}t + \theta_{sig}(t) - \theta_{LO}(t))\} (\sqrt{\alpha} \exp(j\delta) + \sqrt{1-\alpha})$$

S105. Perform digital signal processing on the complex signal.

Specifically, the digital signal processing may include:

A. compensating link dispersion by using a dispersion compensation module;

B. normalization processing;

C. assessing and compensating a channel loss by using a channel equalization module;

D. performing local oscillator frequency offset (local oscillator (LO) frequency offset, LOFO) and carrier phase assessment and correction by using a frequency offset and phase noise assessment and compensation module;

E. decoding by using a DeMapping module;

F. obtaining data by demodulation and calculating a bit error rate (bit error rate, BER) that is obtained before correction; and G. performing forward error correction (forward error correction, FEC) processing.

C is a slowly changing envelope of a received electrical signal, and is a time variable reflecting an SOP rotation speed. In a specific time window, C may be considered as a constant and needs to undergo normalization processing. The normalization processing is assessing and normalizing the parameter C related to an incident angle by using an electrical polarization diversity module. Compared with general double-polarization reception processing, a single-polarization reception processing procedure requires one more step of calculating "C". However, "C" is a slowly changing value that changes between 1 and 1.414 and that affects the BER. A highest BER is obtained when ICI=1, and a lowest BER is obtained when ICI=1.414. Therefore, normalization processing needs to be performed on C.

Figure 2:
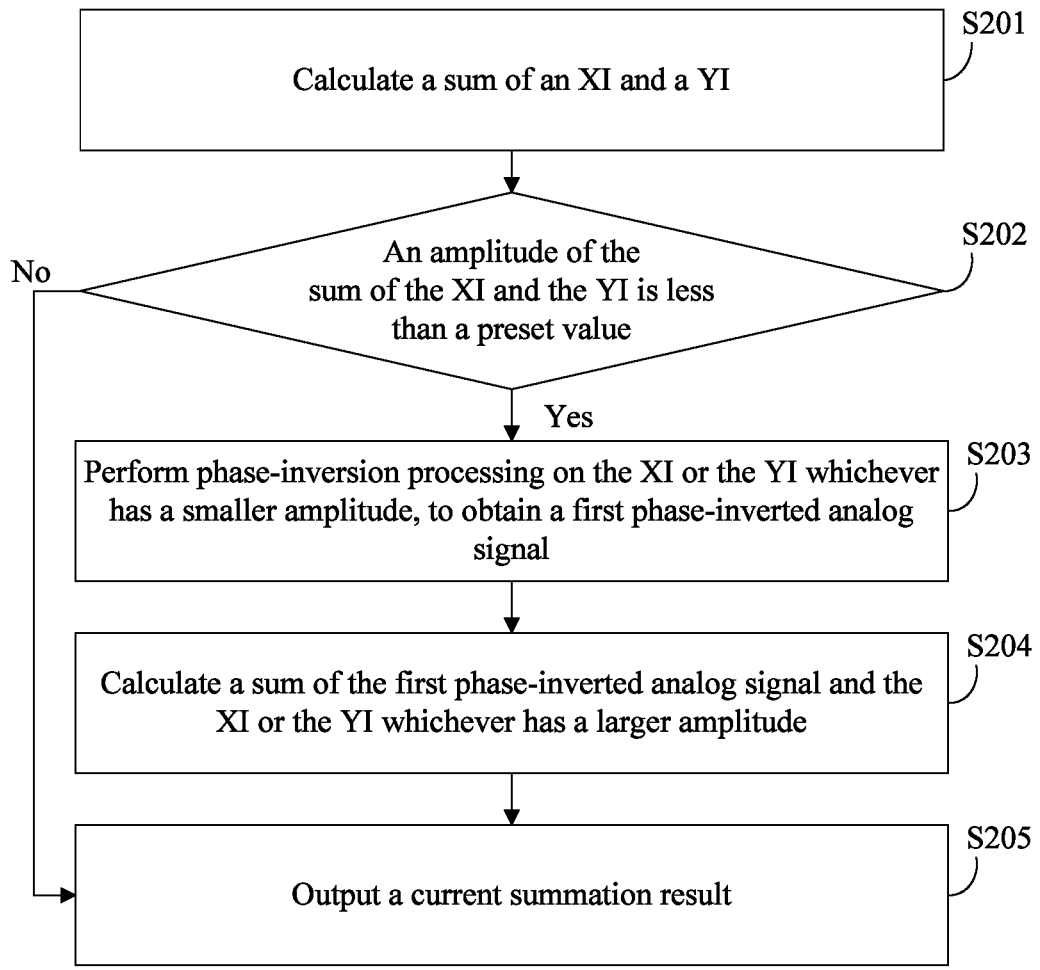
FIG. 2 is a flowchart of a summation procedure in an optical signal processing method according to an embodiment of the present invention.

In this embodiment, as shown in FIG. 2, a specific procedure of calculating the sum of the XI and the YI to obtain the in-phase signal I is as follows:

S201. Calculate the sum of the XI and the YI.

S202. Determine whether an amplitude of the sum of the XI and the YI is less than a preset value; and perform S203 if the amplitude of the sum of the XI and the YI is less than the preset value, or perform S205 if the amplitude of the sum of the XI and the YI is not less than the preset value.

S203. Perform phase-inversion processing on the XI or the YI whichever has a smaller amplitude, to obtain a first phase-inverted analog signal.

S204. Calculate a sum of the first phase-inverted analog signal and the XI or the YI whichever has a larger amplitude.

S205. Output a current summation result.

Similarly, a specific procedure of calculating the sum of the XQ and the YQ to obtain the quadrature signal Q is as follows:

A. Calculate the sum of the XQ and the YQ.

B. Determine whether an amplitude of the sum of the XQ and the YQ is less than a preset value; and perform C if the amplitude of the sum of the XQ and the YQ is less than the preset value, or perform E if the amplitude of the sum of the XQ and the YQ is not less than the preset value.

C. Perform phase-inversion processing on the XQ or the YQ whichever has a smaller amplitude, to obtain a second phase-inverted analog signal.

D. Calculate a sum of the second phase-inverted analog signal and the XQ or the YQ whichever has a larger amplitude.

E. Output a current summation result.

It can be learned from the foregoing steps that, in a procedure of performing summation calculation on analog signals, a preset value is used to determine a summation result; if an amplitude of the summation result is less than the preset value, it indicates that the summation result does not meet a requirement; then phase inversion is performed on an analog signal that has a smaller amplitude, and a phase-inverted analog signal is added up with another analog signal until a summation result is not less than the preset value.

For a single-polarization signal, the single-polarization signal passes through an optical fiber link and then enters a receiver. Electric fields on two state of polarization components x and y are as follows:

$$\begin{bmatrix} E_{in,x} \\ E_{in,y} \end{bmatrix} = \begin{bmatrix} \sqrt{\alpha} A_s e^{j\delta} \\ \sqrt{1-\alpha} A_s \end{bmatrix} \exp(j\omega_s t) \quad (1)$$

Local oscillator light on the two state of polarization components x and y is as follows:

$$\begin{bmatrix} E_{LO,x} \\ E_{LO,y} \end{bmatrix} = \begin{bmatrix} A_{LO} \\ A_{LO} \end{bmatrix} \exp(j\omega_{LO} t) \quad (2)$$

$\alpha$ is a ratio of the two components on two states of polarization, and $\delta$ is a difference between phase angles of two state of polarization components obtained after the signal passes an optical fiber. After balanced reception by an integrated coherent optical receiver (integrated coherent receiver, ICR), four differential received signals are as follows:

$$I_{PD,1} \sim \sqrt{\alpha} \sqrt{P_s(t)P_{LO}} \cos(\omega_{IF}t + \theta_{sig}(t) - \theta_{LO}(t) + \delta) \quad (3)$$

$$I_{PD,2} \sim \sqrt{\alpha} \sqrt{P_s(t)P_{LO}} \sin(\omega_{IF}t + \theta_{sig}(t) - \theta_{LO}(t) + \delta)$$

$$I_{PD,3} \sim \sqrt{1-\alpha} \sqrt{P_s(t)P_{LO}} \cos(\omega_{IF}t + \theta_{sig}(t) - \theta_{LO}(t))$$

$$I_{PD,4} \sim \sqrt{1-\alpha} \sqrt{P_s(t)P_{LO}} \sin(\omega_{IF}t + \theta_{sig}(t) - \theta_{LO}(t))$$

$I_{PD,1}$ and $I_{PD,2}$ always have a same phase. $I_{PD,3}$ and $I_{PD,4}$ always have a same phase. Because of state of polarization (state of polarization, SOP) rotation, $I_{PD,3}$ and $I_{PD,3}$ sometimes have a same phase, and sometimes have a phase difference of 180°.

$I_I$ and $I_Q$ that are obtained by adding up and combining analog signals are as follows:

$$I_I = I_{PD,1} + I_{PD,3} \sim \sqrt{P_s(t)P_{LO}} \left( \sqrt{\alpha} \cos(\omega_{IF}t + \theta_{sig}(t) - \theta_{LO}(t) + \delta) + \sqrt{1-\alpha} \cos(\omega_{IF}t + \theta_{sig}(t) - \theta_{LO}(t)) \right) \quad (4)$$

-continued $$I_Q = I_{PD,2} + I_{PD,4} \sim \sqrt{P_s(t)P_{LO}} \left( \sqrt{\alpha} \sin(\omega_{IF}t + \theta_{sig}(t) - \theta_{LO}(t) + \delta) + \sqrt{1-\alpha} \sin(\omega_{IF}t + \theta_{sig}(t) - \theta_{LO}(t)) \right)$$

According to the summation method in this embodiment, each time $I_I$ or $I_Q$ is less than a reference current $I_{ref}$, that is, a preset value, a phase-inversion operation is performed to make $I_I$ or $I_Q$ increase in a trend of being greater than $I_{ref}$. Therefore, a signal loss (I≈0) does not occur. In actual application, $I_{ref}$ is 1−α. α indicates a sum of noise strengths of a summation module, and may be obtained by means of error measurement. For example, during normal running of a system, an output amplitude is 1-1.414, and α may be 0.2; therefore, $I_{ref}$ may be 0.8.

It should be noted that, for double-polarization modulated signals, it is considered by default that the signals have been orthogonal in a state of polarization x/y before the signals are added up.

According to the summation method in this embodiment, in a summation procedure of single-polarization signals or orthogonal double-polarization signals, the reference current $I_{ref}$ is set to avoid a signal loss. This provides stable performance and facilitates hardware implementation compared with a manner of tracking a state of polarization of light. Based on the foregoing summation method, in the optical signal processing method of this embodiment, the XI and the YI are added up, the XQ and the YQ are added up, and then quantization and subsequent processing are performed. Compared with a manner of quantization first and then addition, this can reduce a quantity of ADCs and therefore achieve an objective of reducing power consumption. In addition, because the summation method in the foregoing embodiment is used, no received signal is lost. Therefore, normal reception of a signal is not affected while the power consumption is reduced.

It should be noted that, in addition to the procedure shown in FIG. 1, in optical signal processing, only one of the in-phase signal I or the quadrature signal Q may be calculated. Quantization and digital signal processing are performed on a summation result and another signal that does not participate in summation. Specifically, after receiving the XI, the YI, the XQ, and the YQ, the coherent receiver calculates the sum of the XI and the YI to obtain the in-phase signal I; then separately quantizes the in-phase signal I, the XQ, and the YQ; and then performs digital signal processing on quantized signals. Alternatively, after receiving the XI, the YI, the XQ, and the YQ, the coherent receiver calculates the sum of the XQ and the YQ to obtain the quadrature signal Q; then separately quantizes the in-phase signal Q, the XI, and the YI; and then performs digital signal processing on quantized signals.

Figure 3:
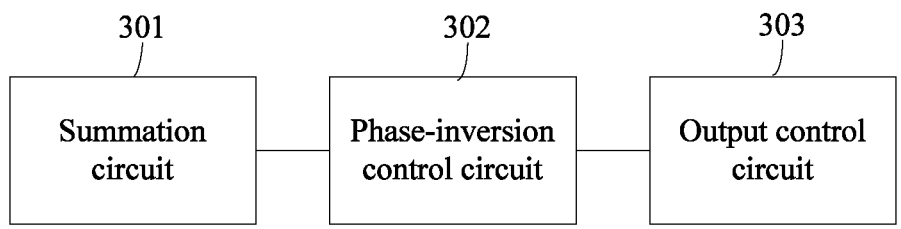
FIG. 3 is a schematic structural diagram of a summation module according to an embodiment of the present invention.

Corresponding to the summation method shown in FIG. 2, an embodiment of this application discloses a summation module. As shown in FIG. 3, the summation module includes a summation circuit 301, a phase-inversion control circuit 302, and an output control circuit 303.

Specifically, the summation circuit 301 is configured to calculate a sum of a first analog signal and a second analog signal. The phase-inversion control circuit 302 is configured to: if an amplitude of the sum of the first analog signal and the second analog signal is less than a preset value, perform phase-inversion processing on the first analog signal or the second analog signal whichever has a smaller amplitude, to obtain a phase-inverted analog signal.

The summation circuit 301 is further configured to calculate a sum of the phase-inverted analog signal and the first analog signal or the second analog signal whichever has a larger amplitude.

The output control circuit 303 is configured to: if the amplitude of the sum of the first analog signal and the second analog signal is less than the preset value, output the sum of the first analog signal and the second analog signal; or if the amplitude of the sum of the first analog signal and the second analog signal is not less than the preset value, output the sum of the phase-inverted analog signal and the first analog signal or the second analog signal whichever has a larger amplitude.

Figure 4:
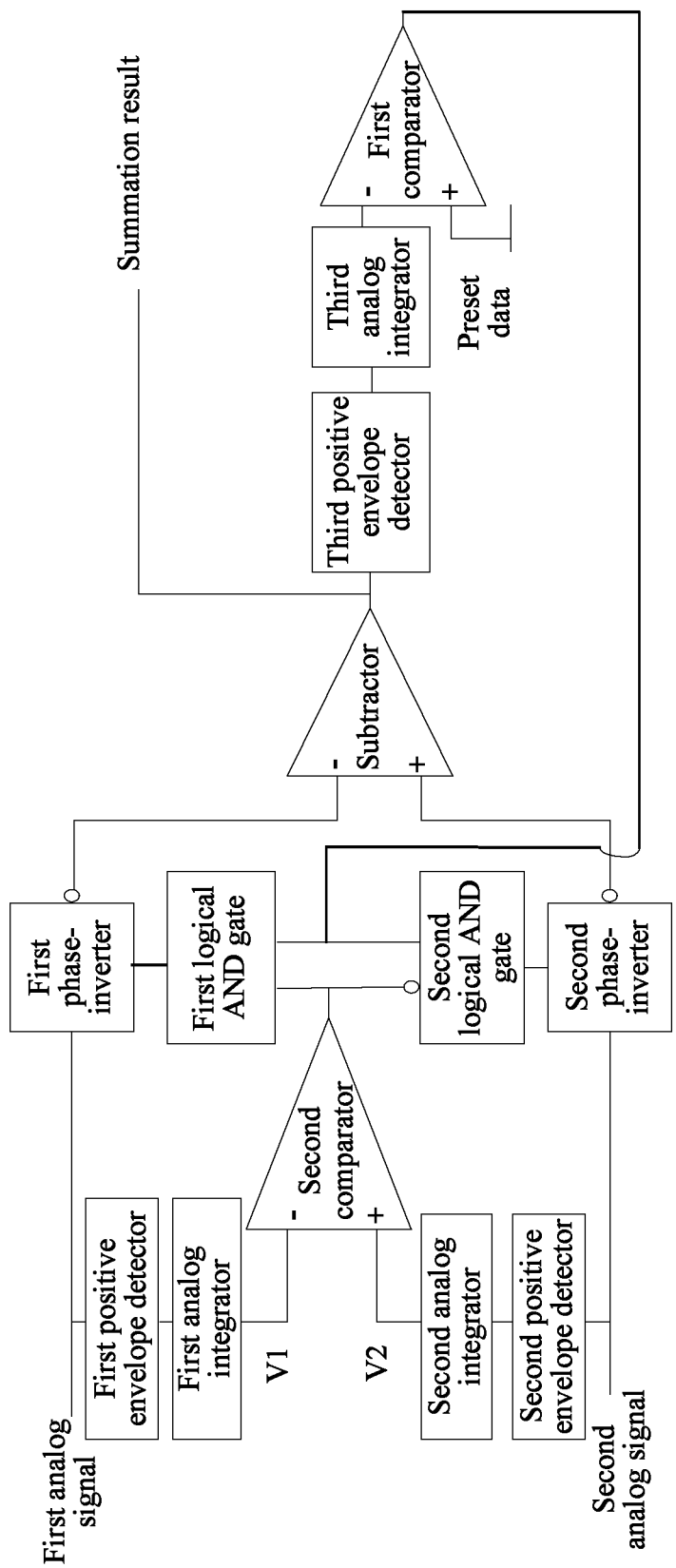
FIG. 4 is a schematic diagram of a hardware circuit of the summation module disclosed in FIG. 3.
Figure 5:
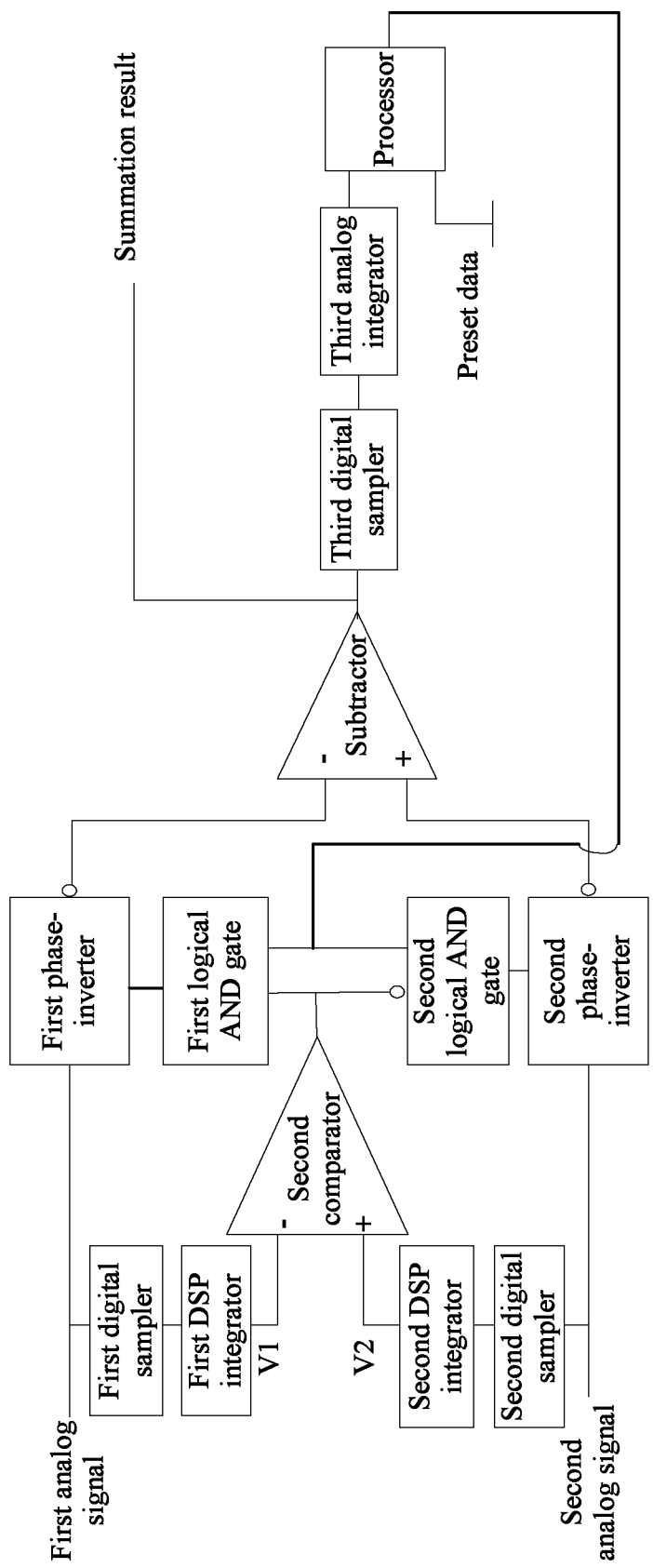
FIG. 5 is a schematic diagram of another hardware circuit of the summation module disclosed in FIG. 3.

Specifically, the apparatus in this embodiment may be implemented by using a hardware structure shown in FIG. 4 or FIG. 5.

A signal summation apparatus based on an analog domain in FIG. 4 specifically includes:

a subtractor, a first comparator, a first positive envelope detector, a second positive envelope detector, a third positive envelope detector, a first analog integrator, a second analog integrator, a third analog integrator, a second comparator, a first phase-inverter, a second phase-inverter, a first logical AND gate, a second logical AND gate, a logical NOT gate (represented by a mark NOT and a symbol ○ in FIG. 4), and a control output circuit.

For ease of implementation, a summation circuit is formed by using the subtractor and one phase-inverter. To simplify a circuit structure, in this embodiment, any one of the first phase-inverter or the second phase-inverter may be used together with the subtractor to implement a summation function. In this embodiment, description is provided by using an example in which the first phase-inverter and the subtractor implement a summation function together. It should be noted that the first phase-inverter enables a phase-inversion function during initialization of the circuit. A working procedure of the circuit shown in FIG. 4 is as follows.

A first analog signal passes through the first phase-inverter and is input into the subtractor. A second analog signal is input into the subtractor. The subtractor outputs a sum of the first analog signal and the second analog signal. The third positive envelope detector detects a positive envelope value of an output signal of the subtractor. The third analog integrator calculates an amplitude of the output signal of the subtractor according to a detection result of the third positive envelope detector. The amplitude of the output signal of the subtractor is input into an input end of the first comparator, and preset data is input into another input end. If the amplitude of the output signal of the subtractor is less than a preset value, the first comparator outputs a high level; otherwise, if the amplitude of the output signal of the subtractor is not less than a preset value, the first comparator outputs a low level. In addition, the output control circuit outputs the sum of the first analog signal and the second analog signal.

The first positive envelope detector detects a positive envelope value of the first analog signal. The second positive envelope detector detects a positive envelope value of the second analog signal. The first analog integrator calculates an amplitude V1 of the first analog signal according to the positive envelope value of the first analog signal. The second analog integrator calculates an amplitude V2 of the second analog signal according to the positive envelope value of the second analog signal. The V1 is input into an input end of the second comparator, and the V2 is input into another input end. If the V1 is less than the V2, a high level is output; otherwise, if the V2 is less than the V1, a low level is output.

The first phase-inverter is connected to the first comparator and the second comparator by using the first logical AND gate. If the first comparator outputs the high level and the second comparator also outputs the high level, the phase-inversion function (the phase-inversion function has been enabled during the initialization) of the first phase-inverter is maintained by a high level that is output by the first logical AND gate, and a phase-inverted signal of the first analog signal is output and is marked as a phase-inverted analog signal.

The second phase-inverter is connected to the first comparator by using the second logical AND gate, and is connected to the second comparator by using the second logical AND gate and the logical NOT gate. If the first comparator outputs the high level and the second comparator outputs the low level, a phase-inversion function of the second phase-inverter is triggered by a high level that is output by the second logical AND gate, and a phase-inverted signal of the first analog signal is output and is marked as a phase-inverted analog signal.

Based on FIG. 4, the phase-conversion function of only one of the first phase-inverter or the second phase-inverter may be triggered at one time point, so as to perform phase inversion on the first analog signal or the second analog signal whichever has a smaller amplitude.

If the first comparator outputs the low level, both the first logical AND gate and the second logical AND gate output a low level, and phase-inversion functions of both the first phase-inverter and the second phase-inverter are disabled. The phase-inverted analog signal and the first analog signal or the second analog signal whichever has a larger amplitude are separately input into the subtractor, to obtain a new summation result. The output control circuit outputs the current summation result.

In FIG. 4, the three positive envelope detectors may be all low-speed positive envelope detectors, the two comparators may be both low-speed comparators, the logical AND gates may be both low-speed logical AND gates, the subtractor may be a high-speed subtractor, and the two phase-inverters may be both high-speed phase-inverters, where a low speed is of a kHz magnitude, and a high speed is of a GHz magnitude.

FIG. 5 discloses another circuit implementation of a signal summation apparatus based on an analog domain. A difference from the circuit shown in FIG. 5 lies in: in FIG. 5, a first digital sampler is used to replace a first positive envelope detector, and is configured to perform sampling on a first analog signal; a second digital sampler is used to replace a second positive envelope detector, and is configured to perform sampling on a second analog signal; a third digital sampler is used to replace a third positive envelope detector, and is configured to perform sampling on an output signal of a subtractor; a first DSP integrator is used to replace a first analog integrator, and is configured to calculate an amplitude of the first analog signal according to a sampling value of the first analog signal; a second DSP integrator is used to replace a second analog integrator, and is configured to calculate an amplitude of the second analog signal according to a sampling value of the second analog signal; and a processor (such as a DSP processor) is used to replace a first comparator.

The (DSP) processor is configured to: calculate an amplitude of the output signal of the subtractor according to a sampling value of the output signal of the subtractor; and output a high level if the amplitude of the output signal of the subtractor is less than a preset value, or output a low level if the amplitude of the output signal of the subtractor is not less than a preset value.

For other parts in FIG. 5, refer to FIG. 4. Details are not described herein again.

It should be noted that, in the circuits shown in FIG. 4 and FIG. 5, functional modules that easily cause interruption, such as a phase detector and a switch, are not used, and a phase-inverter is enabled only at a zero crossing point of a signal. Noise can be identified, and no system burst error is caused. Therefore, a circuit structure used in this embodiment is highly stable and easy to implement.

Figure 6:
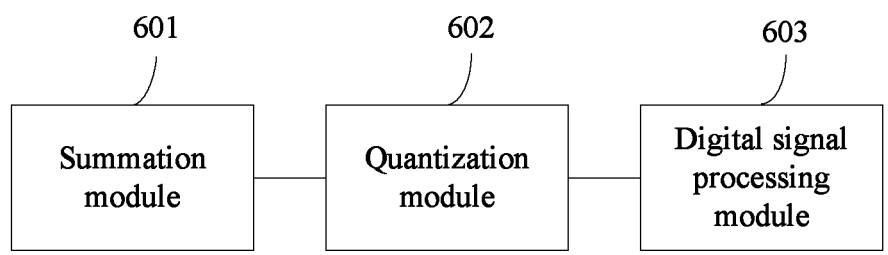
FIG. 6 is a schematic structural diagram of a coherent receiver according to an embodiment of the present invention.

An embodiment of this application further discloses a coherent receiver. As shown in FIG. 6, the coherent receiver includes a summation module 601, a quantization module 602, and a digital signal processing module 603.

The summation module 601 is configured to: add up an in-phase analog signal XI in a first polarization direction and an in-phase analog signal YI in a second polarization direction, to obtain an in-phase signal I, where the in-phase analog signal XI and the in-phase analog signal YI are received by means of coherence; and add up a quadrature analog signal XQ in the first polarization direction and a quadrature analog signal YQ in the second polarization direction, to obtain a quadrature signal Q, where the quadrature analog signal XQ and the quadrature analog signal YQ are received by means of coherence.

Specifically, for a structure and a function of the summation module, refer to FIG. 3, FIG. 4, or FIG. 5. Details are not described herein again. It needs to be emphasized that, if the summation module is configured to calculate the in-phase signal I, the first analog signal is the XI, the second analog signal is the YI, and the phase-inverted analog signal is a first phase-inverted analog signal; or if the summation module is configured to calculate the quadrature signal Q, the first analog signal is the XQ, the second analog signal is the YQ, and the phase-inverted analog signal is a second phase-inverted analog signal.

The quantization module 602 is configured to separately quantize the in-phase signal I and the quadrature signal Q.

Generally, the quantization module may be two ADCs, which separately quantize the I and the Q.

The digital signal processing module 603 is configured to: after quantized signals are combined into a complex signal, perform digital signal processing on the complex signal.

Specifically, a specific implementation of performing digital signal processing by the processing module may be: performing normalization processing on the complex signal, and performing data signal processing on the normalization result.

Specifically, based on the digital signal processing procedure in the foregoing method embodiment, the digital signal processing module in this embodiment may be a controller, configured to implement a series of digital signal processing functions.

The receiver in this embodiment is characterized by low power consumption.

Another coherent receiver disclosed in an embodiment of this application includes a summation module, a quantization module, and a digital signal processing module.

A difference from the coherent receiver shown in FIG. 6 lies in: a function of the summation module is only to add up an in-phase analog signal XI in a first polarization direction and an in-phase analog signal YI in a second polarization direction, to obtain an in-phase signal I, where the in-phase analog signal XI and the in-phase analog signal YI are received by means of coherence; and the quantization module is configured to separately quantize the in-phase signal I, an XQ, and a YQ.

For a structure of the summation module, refer to FIG. 3, FIG. 4, or FIG. 5. Details are not described herein again.

The apparatus in this embodiment may use three ADCs and has relatively low energy consumption compared with an existing receiver that uses four ADCs.

Still another coherent receiver disclosed in an embodiment of this application includes a summation module, a quantization module, and a digital signal processing module.

A difference from the coherent receiver shown in FIG. 6 lies in: a function of the summation module is only to add up a quadrature analog signal XQ in a first polarization direction and a quadrature analog signal YQ in a second polarization direction, to obtain a quadrature signal Q, where the quadrature analog signal XQ and the quadrature analog signal YQ are received by means of coherence; and the quantization module is configured to separately quantize the quadrature signal Q, an XI, and a YI.

For a structure of the summation module, refer to FIG. 3, FIG. 4, or FIG. 5. Details are not described herein again.

The apparatus in this embodiment may use three ADCs and has relatively low energy consumption compared with an existing receiver that uses four ADCs.

If the functions of the method in the embodiments are implemented in a form of a software function unit and sold or used as an independent product, the functions may be stored in a storage medium that can be read by a computing device. Based on such an understanding, the part that is of the embodiments of the present invention and that contributes to the prior art or some of the technical solutions may be implemented in a form of a software product. The software product is stored in a storage medium, and includes several instructions for instructing a computing device (which may be a personal computer, a server, a mobile computing device, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use the present invention. Various modifications to the embodiments are obvious to a person skilled in the art, and general principles defined in this specification may be implemented in other embodiments without departing from the spirit or scope of the present invention. Therefore, the present invention is not intended to be limited to these embodiments illustrated in this specification, but shall be construed in the widest scope consistent with the principles and novel features disclosed in this specification.

What is claimed is:

1. An optical signal processing method, comprising:
separately quantizing, by a coherent receiver, an in-phase signal I and a quadrature signal Q; and
after combining quantized signals I and Q into a complex signal, performing, by the coherent receiver, digital signal processing on the complex signal, wherein
a procedure of obtaining the in-phase signal I comprises: calculating, by the coherent receiver, a sum of an in-phase signal XI in a first polarization direction and an in-phase signal YI in a second polarization direction; and if the sum of the XI and the YI is less than a preset value, obtaining the in-phase signal I by calculating a sum of a first phase-inverted analog signal and the XI or the YI, whichever has a larger amplitude, wherein the first phase-inverted analog signal is a signal obtained by performing phase-inversion processing on the XI or the YI, whichever has a smaller amplitude; and
a procedure of obtaining the quadrature signal Q comprises: calculating, by the coherent receiver, a sum of a quadrature analog signal XQ in the first polarization direction and a quadrature analog signal YQ in the second polarization direction; and if the sum of the XQ and the YQ is less than a preset value, obtaining the quadrature signal Q by calculating a sum of a second phase-inverted analog signal and the XQ or the YQ, whichever has a larger amplitude, wherein the second phase-inverted analog signal is a signal obtained by performing phase-inversion processing on the XQ or the YQ, whichever has a smaller amplitude.

2. The method according to claim 1, wherein the procedure of obtaining the in-phase signal I further comprises:
if the sum of the XI and the YI is not less than the preset value, the sum of the XI and the YI is a summation result; and
the procedure of obtaining the quadrature signal Q further comprises:
if the sum of the XQ and the YQ is not less than the preset value, the sum of the XQ and the YQ is a summation result.

3. The method according to claim 1, wherein the performing digital signal processing on the complex signal comprises:
performing normalization processing on the complex signal, and performing digital signal processing on the normalization result.

4. A coherent receiver, comprising:
a quantization device, configured to separately quantize an in-phase signal I and a quadrature signal Q;
a digital signal processor, configured to: after quantized signals I and Q are combined into a complex signal, perform digital signal processing on the complex signal; and
a summation device, configured to obtain the in-phase signal I and obtain the quadrature signal Q, wherein a procedure of obtaining the in-phase signal I comprises: calculating a sum of an in-phase analog signal XI in a first polarization direction and a received in-phase analog signal YI in a second polarization direction; and if the sum of the XI and the YI is less than a preset value, obtaining the in-phase signal I by calculating a sum of a first phase-inverted analog signal and the XI or the YI, whichever has a larger amplitude, wherein the first phase-inverted analog signal is a signal obtained by performing phase-inversion processing on the XI or the YI, whichever has a smaller amplitude; and a procedure of obtaining the quadrature signal Q comprises: calculating a sum of a received quadrature analog signal XQ in the first polarization direction and a received quadrature analog signal YQ in the second polarization direction; and if the sum of the XQ and the YQ is less than a preset value, obtaining the quadrature signal Q by calculating a sum of a second phase-inverted analog signal and the XQ or the YQ, whichever has a larger amplitude, wherein the second phase-inverted analog signal is a signal obtained by performing phase-inversion processing on the XQ or the YQ, whichever has a smaller amplitude.

5. The coherent receiver according to claim 4, wherein the summation device comprises:

a summation circuit, a phase-inversion control circuit, and an output control circuit, wherein the summation circuit is configured to calculate a sum of a first analog signal and a second analog signal;

the phase-inversion control circuit is configured to: if an amplitude of the sum of the first analog signal and the second analog signal is less than a preset value, perform phase-inversion processing on the first analog signal or the second analog signal, whichever has a smaller amplitude, to obtain a phase-inverted analog signal;

the summation circuit is further configured to calculate a sum of the phase-inverted analog signal and the first analog signal or the second analog signal, whichever has a larger amplitude; and the output control circuit is configured to: if the amplitude of the sum of the first analog signal and the second analog signal is not less than the preset value, output the sum of the phase-inverted analog signal and the first analog signal or the second analog signal, whichever has a larger amplitude, wherein if the summation device is configured to calculate the in-phase signal I, the first analog signal is the XI, the second analog signal is the YI, and the phase-inverted analog signal is the first phase-inverted analog signal; or if the summation device is configured to calculate the quadrature signal Q, the first analog signal is the XQ, the second analog signal is the YQ, and the phase-inverted analog signal is the second phase-inverted analog signal.

6. The coherent receiver according to claim 5, wherein the output control circuit is further configured to:

if the amplitude of the sum of the first analog signal and the second analog signal is less than the preset value, output the sum of the first analog signal and the second analog signal.

7. The coherent receiver according to claim 5, wherein the phase-inversion control circuit comprises:

a first comparator, configured to output a high level if the amplitude of the sum of the first analog signal and the second analog signal is less than the preset value;

a second comparator, configured to: output a high level if an amplitude of the first analog signal is less than an amplitude of the second analog signal, or output a low level if an amplitude of the second analog signal is less than an amplitude of the first analog signal;

a first phase-inverter, separately connected to the first comparator and the second comparator by a first logical AND gate, wherein when both the first comparator and the second comparator output a high level, a phase-inversion function is triggered by a high level that is output by the first logical AND gate, to obtain the phase-inverted analog signal; and a second phase-inverter, connected to the first comparator by a second logical AND gate and connected to the second comparator by using the second logical AND gate and a logical NOT gate, wherein when the first comparator outputs the high level and the second comparator outputs the low level, a phase-inversion function is triggered by a high level that is output by the second logical AND gate, to obtain the phase-inverted analog signal.

8. The coherent receiver according to claim 7, wherein the first comparator is further configured to:

output a low level if the amplitude of the sum of the first analog signal and the second analog signal is not less than the preset value.

9. The coherent receiver according to claim 7, further comprising:

a first positive envelope detector, configured to detect a positive envelope value of the first analog signal;

a first analog integrator, configured to calculate the amplitude of the first analog signal according to the positive envelope value of the first analog signal;

a second positive envelope detector, configured to detect a positive envelope value of the second analog signal;

a second analog integrator, configured to calculate the amplitude of the second analog signal according to the positive envelope value of the second analog signal;

a third positive envelope detector, configured to detect a positive envelope value of an output signal of the summation circuit; and a third analog integrator, configured to calculate an amplitude of the output signal of the summation circuit according to the positive envelope value of the output signal of the summation circuit.

10. The coherent receiver according to claim 5, wherein the phase-inversion control circuit comprises:

a processor, configured to: output a high level if the amplitude of the sum of the first analog signal and the second analog signal is less than the preset value, or output a low level if the amplitude of the sum of the first analog signal and the second analog signal is not less than the preset value;

a comparator, configured to: output a high level if an amplitude of the first analog signal is less than an amplitude of the second analog signal, or output a low level if an amplitude of the second analog signal is less than an amplitude of the first analog signal;

a first phase-inverter, separately connected to the processor and the comparator by a first logical AND gate, wherein when both the processor and the comparator output a high level, a phase-inversion function is triggered by a high level that is output by the first logical AND gate, to obtain the phase-inverted analog signal; and a second phase-inverter, connected to the processor by using a second logical AND gate and connected to the comparator by the second logical AND gate and a logical NOT gate, wherein when the processor outputs the high level and the comparator outputs the low level, a phase-inversion function is triggered by a high level that is output by the second logical AND gate, to obtain the phase-inverted analog signal.

11. The coherent receiver according to claim 10, further comprising:

a first digital sampler, configured to perform sampling on the first analog signal;

a first DSP integrator, configured to calculate the amplitude of the first analog signal according to a sampling value of the first analog signal;

a second digital sampler, configured to perform sampling on the second analog signal;

a second DSP integrator, configured to calculate the amplitude of the second analog signal according to a sampling value of the second analog signal; and a third digital sampler, configured to perform sampling on an output signal of the summation circuit, wherein the processor is further configured to:

calculate an amplitude of the output signal of the summation circuit according to a sampling value of the output signal of the summation circuit.

12. The coherent receiver according to claim 5, wherein the summation circuit comprises:

a phase-inverter and a subtractor, wherein the phase-inverter is connected to an input end of the subtractor, and is configured to perform phase-inversion processing on the first analog signal; and the subtractor is configured to output a result that is obtained by subtracting a first phase-inverted analog signal from the second analog signal.

13. The coherent receiver according to claim 4, wherein that the processor is configured to: after quantized signals are combined into a complex signal, perform digital signal processing on the complex signal comprises:

the processor is configured to: perform normalization processing on the complex signal, and perform data signal processing on the normalization result.

14. The coherent receiver according to claim 4, wherein the quantization device includes two analog-to-digital converters.

* * * * *